(12) United States Patent
Lin et al.

(10) Patent No.: US 10,802,551 B1
(45) Date of Patent: Oct. 13, 2020

(54) DISPLAY DEVICE AND A HINGE MECHANISM THEREWITH

(71) Applicant: FOSITEK CORPORATION, New Taipei (TW)

(72) Inventors: Chun-Han Lin, New Taipei (TW); Way-Han Dai, New Taipei (TW); Yu-Chieh Li, New Taipei (TW); Seita Horikoshi, Yokohama (JP)

(73) Assignee: FOSITEK CORPORATION, New Taipei (TW)

( * ) Notice: Subject to any disclaimer, the term of this patent is extended or adjusted under 35 U.S.C. 154(b) by 0 days.

(21) Appl. No.: 16/742,303

(22) Filed: Jan. 14, 2020

(30) Foreign Application Priority Data

Oct. 29, 2019 (CN) .......................... 2019 1 1036442
Oct. 29, 2019 (CN) ..................... 2019 2 1836774 U

(51) Int. Cl.
| | |
|---|---|
| *G06F 1/16* | (2006.01) |
| *F16C 11/04* | (2006.01) |
| *E05D 3/06* | (2006.01) |
| *E05D 3/12* | (2006.01) |
| *E05D 11/00* | (2006.01) |
| *E05D 11/08* | (2006.01) |

(52) U.S. Cl.
CPC ............. *G06F 1/1681* (2013.01); *E05D 3/06* (2013.01); *E05D 3/122* (2013.01); *E05D 11/0054* (2013.01); *E05D 11/087* (2013.01); *F16C 11/04* (2013.01); *G06F 1/1652* (2013.01); *E05Y 2201/11* (2013.01); *E05Y 2900/606* (2013.01); *F16C 2380/00* (2013.01)

(58) Field of Classification Search
CPC . G06F 1/1681; G06F 1/1652; E05Y 2900/606
USPC ............................ 361/679.26, 679.27, 679.3
See application file for complete search history.

(56) References Cited

U.S. PATENT DOCUMENTS

| | | | |
|---|---|---|---|
| 10,401,917 B1 * | 9/2019 | Dai ........................ | G06F 1/1681 |
| 10,599,189 B1 * | 3/2020 | Hsu .......................... | E05D 3/18 |
| 2014/0174226 A1 * | 6/2014 | Hsu ........................ | G06F 1/1681 |
| | | | 74/98 |
| 2014/0174227 A1 * | 6/2014 | Hsu ........................... | E05D 3/14 |
| | | | 74/98 |
| 2016/0090763 A1 * | 3/2016 | Hsu ......................... | E05D 3/122 |
| | | | 16/354 |
| 2018/0087563 A1 * | 3/2018 | Hsu ......................... | E05D 11/00 |

* cited by examiner

*Primary Examiner* — Anthony Q Edwards
(74) *Attorney, Agent, or Firm* — Birch, Stewart, Kolasch & Birch, LLP

(57) ABSTRACT

A hinge mechanism includes a plurality of linkage units, each including a base bar and two rotating assemblies pivotally connected with two carrying sections of the base bar. Each rotating assembly has a synchronous rotation bar, a friction plate and a torsion plate. The friction plate has a first major plate body and a friction increasing portion inclined outwardly from the major plate body. The rotating assemblies are turnable relative to the base bar between unfolded and folded positions. During the turning, the friction increasing portion is gradually overlapped upon and in frictional contact with the torsion plate so as to increase a friction force for providing a stable turning.

9 Claims, 19 Drawing Sheets

DISPLAY DEVICE AND A HINGE MECHANISM THEREWITH

CROSS-REFERENCE TO RELATED APPLICATION

This application claims priority of Chinese Patent Application No. 201911036442.0, filed on Oct. 29, 2019, and Chinese Patent Application No. 201921836774.2, filed on Oct. 29, 2019.

FIELD

The disclosure relates to a display device, and more particularly to a display device and a hinge mechanism therewith.

BACKGROUND

Hinge mechanisms are commonly used in consumer electronic products, such as smart phones, tablets, and notebook computers, such that two component parts (such as a display screen and a keyboard of a notebook computer, a stand and a display screen of a tablet computer, etc.) can be pivoted, or even folded as a flexible display screen of a tablet or a smart phone. However, during the pivoting, a discontinuous or insufficient friction is applied to conventional hinge mechanisms, which incurs an unstable feeling to the user or even results in loosening and undesired movement of the folded component parts.

SUMMARY

Therefore, an object of the disclosure is to provide a hinge mechanism that provides a stable and sufficient friction to alleviate at least one of the drawbacks of the prior art.

According to the disclosure, a hinge mechanism includes a plurality of linkage units aligned with and juxtaposed to each other in an inner-outer direction. Each linkage unit includes a base bar and two rotating assemblies. The base bar has two carrying sections which are integrally formed with and opposite to each other in a left-right direction transverse to the inner-outer direction. Each carrying section has a central pivot portion and an end pivot portion. The central pivot portions of the carrying sections are integrally connected with each other. The rotating assemblies are respectively and pivotally connected with the carrying sections. Each rotating assembly has a synchronous rotation bar, a friction plate and a torsion plate. The synchronous rotation bar has a first pivot end which is pivotally connected with the central pivot portion of the respective carrying section, and a second pivot end opposite to the first pivot end. The first pivot ends of the synchronous rotation bars mesh with each other so as to allow synchronous rotations of the second pivot ends in opposite directions. The friction plate has proximate and distal end portions relative to the synchronous rotation bar, a first major plate body interposed between the proximate and distal end portions, and a friction increasing portion extending from and inclined outwardly away from the first major plate body in the inner-outer direction to not be coplanar with the first major plate body. The distal end portion is pivotally connected with the end pivot portion of the respective carrying section. The friction increasing portion has a first inclined segment and a second inclined segment proximate to and distal from the first major plate body, respectively. The torsion plate is disposed outwardly of the friction plate and the synchronous rotation bar in the inner-outer direction, and has a second major plate body which is pivotally connected with the proximate end portion of the friction plate and which extends in the left-right direction to terminate at a link end and a driven end proximate to and distal from the synchronous rotation bar, respectively. The link end is pivotally connected with the second pivot end of the synchronous rotation bar. The torsion plates of the rotating assemblies are synchronously turnable relative to the base bar, through a torque generated as a result of the synchronous rotations of the second pivot ends, between an unfolded position, where the torsion plates extend in the left-right direction, the first inclined segment of the friction increasing portion of the friction plate is in frictional contact with the second major plate body with a friction force, and the second inclined segment is spaced apart from the respective torsion plate in the inner-outer direction, and a folded position, where the torsion plates extend in an up-down direction transverse to both the inner-outer direction and the left-right direction and are remote from each other in the left-right direction to form a bending space therebetween. During turning of the torsion plates from the unfolded position to the folded position, the second inclined segment is gradually overlapped upon the second major plate body to increase the friction force.

Another object of the disclosure is to provide a display device that can be alleviate at least one of the drawbacks of the prior art.

According to the disclosure, a display device includes two hinge mechanisms as described above, two device housings, and a flexible display sheet attached to the device housings. Each hinge mechanism further includes two coupling brackets respectively mounted on the device housings and respectively connected with the torsion plates of the rotating assemblies. When the torsion plates of the rotating assemblies of each hinge mechanism is in the folded position, the device housings are remote from each other to form a receiving space therebetween and the flexible display sheet is bent to have a bending portion received in the receiving space.

BRIEF DESCRIPTION OF THE DRAWINGS

Other features and advantages of the disclosure will become apparent in the following detailed description of the embodiment with reference to the accompanying drawings, of which.

DETAILED DESCRIPTION

Figure 1:
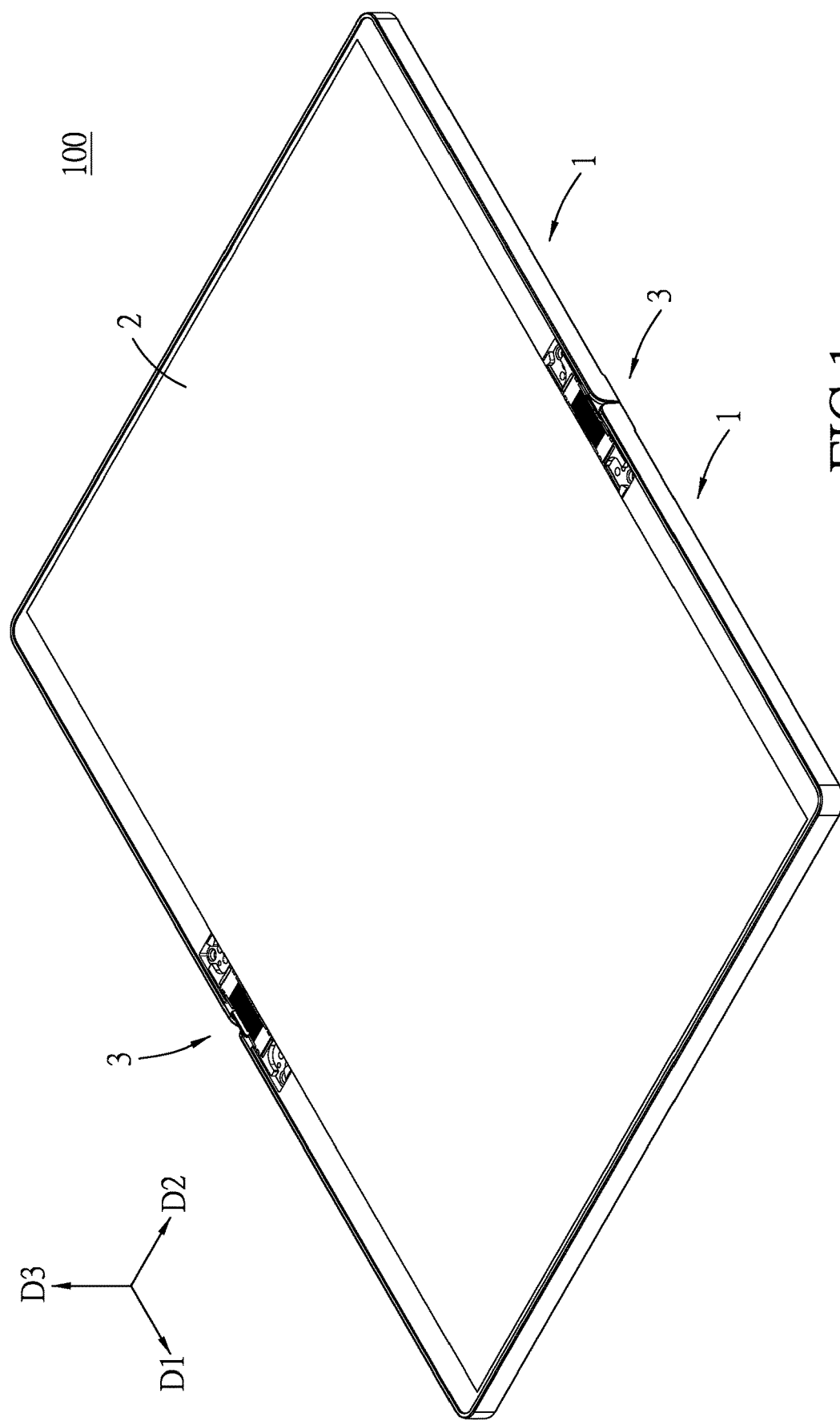
FIG. 1 is a perspective view illustrating an embodiment of a display device according to the disclosure in a flat lying state.

Referring to FIG. 1, an embodiment of a display device 100 according to the disclosure is an inwardly foldable tablet computer. The display device 100 includes two device housings 1, a flexible display sheet 2 and two hinge mechanisms 3.

Figure 2:
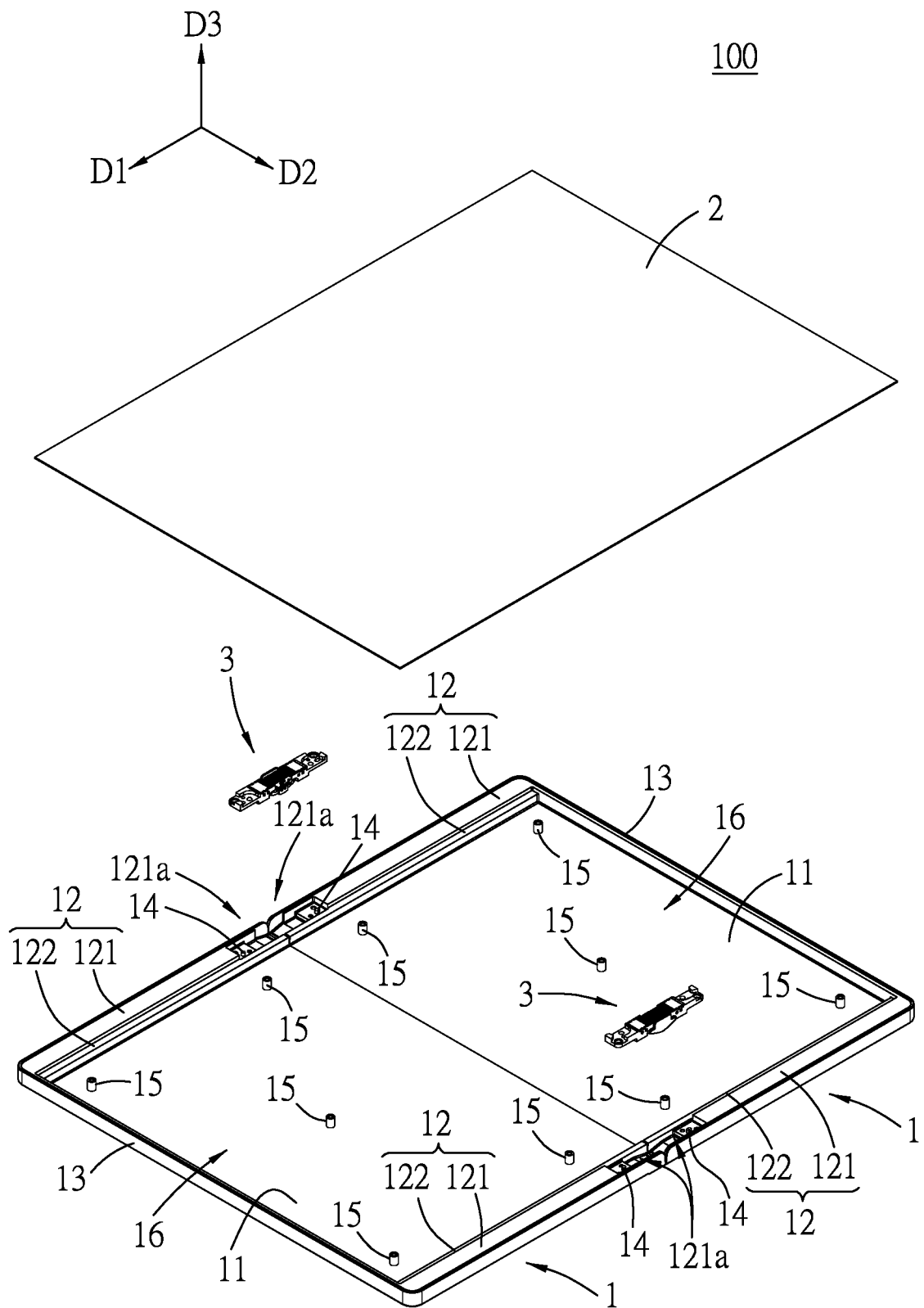
FIG. 2 is an exploded perspective view of the embodiment.

Referring to FIG. 2, each of the device housings 1 includes a base major wall 11, two first side walls 12, a second side wall 13, two positioning posts 14 and a plurality of bracing posts 15. In this embodiment, the base major wall 11 is rectangular. The first side walls extend upwardly and respectively from two short peripheral edges of the base major wall 11 and opposite to each other in an inner-outer direction (D2). The second side wall 13 extends upwardly from a long peripheral edge of the base major wall 11 to interconnect the first side walls 12 so as to cooperate with the base major wall 11 and the first side walls 12 to define a sheet mounting space 16 thereamong for accommodating the flexible display sheet 2. The other long peripheral edges of the base major walls 11 of the device housings 1 are close and coupled to each other by the hinge mechanisms 3.

Figure 3:
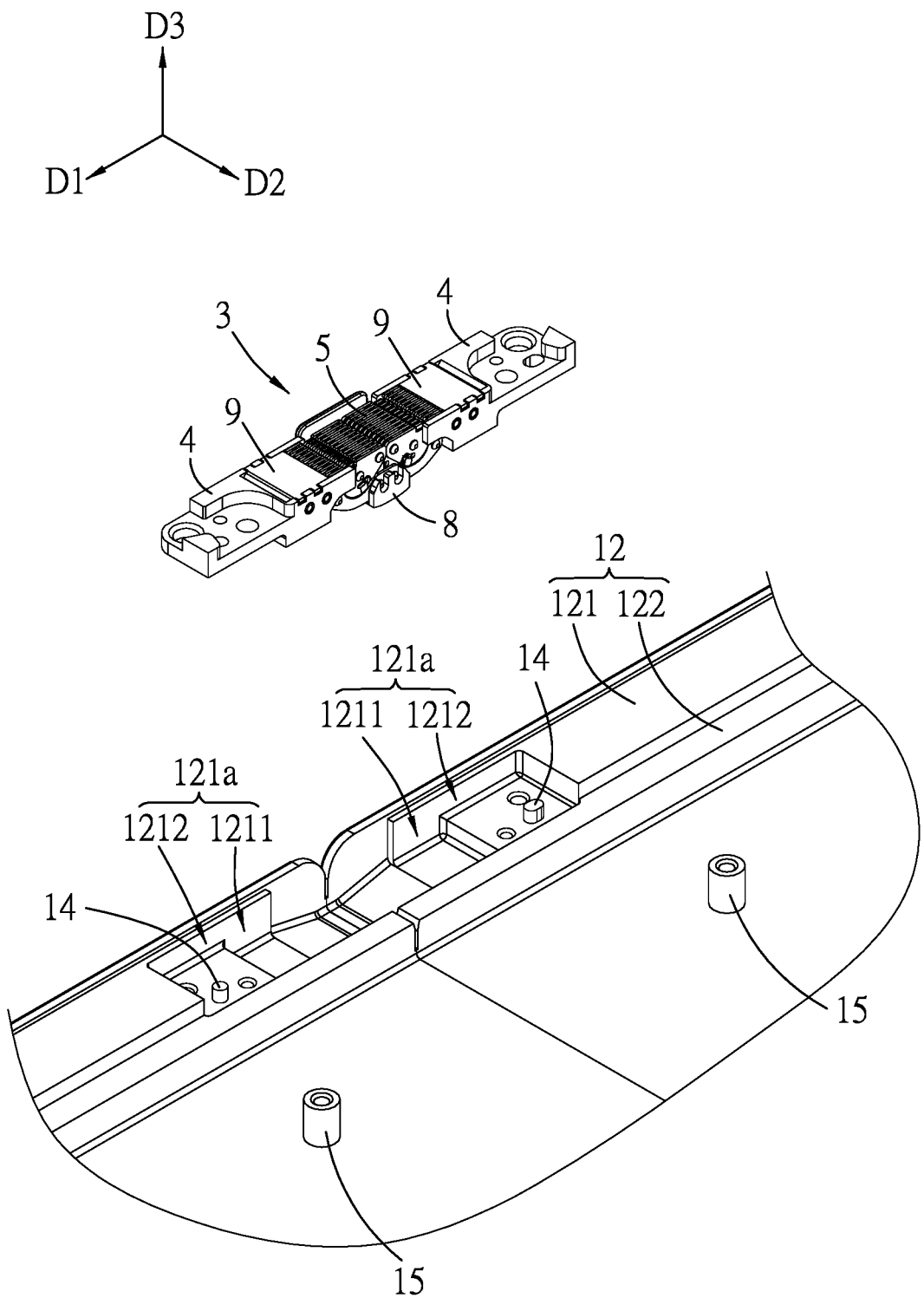
FIG. 3 is a fragmentary exploded perspective view of a portion of the embodiment in FIG. 2.

Specifically, each of the first side walls 12 has a sheet aligning wall surface 121 extending in a left-right direction (D1) that is transverse to the inner-outer direction (D2), and a sheet attaching wall surface 122 formed inwardly of and lower than the sheet aligning wall surface 121. The first side walls 12 of the device housings 1 at the same peripheral edge respectively have mounting recesses 121a which are aligned with each other in the left-right direction (D1) for cooperatively receiving a respective one of the hinge mechanisms 3. With reference to FIG. 3, each of the mounting recesses 121a includes a deep recess portion 1211 and a shallow recess portion 1212 aligned with each other in the left-right direction (D1). Each positioning post 14 is formed in the respective shallow recess portion 1212 to position the hinge mechanism 3 in the aligned mounting recesses 121a. The bracing posts 15 extend from a top surface of the base major wall 11. The flexible display sheet 2 is disposed in the sheet mounting spaces 16, and has a bottom major surface attached to the sheet attaching wall surfaces 122 of the first side walls 12 and the bracing posts 15, and a top major surface aligned with the sheet aligning wall surfaces 121 of the first side walls 12. A plurality of fasteners (not shown) are disposed to fasten the flexible display sheet 2 to the bracing posts 15. Four side edges of the flexible display sheet 2 abut against the sheet aligning wall surfaces 121 and the second side walls 13 such that the top major surface of the flexible display sheet 2 is flush with the sheet aligning wall surfaces 121.

Referring to FIGS. 3 to 6, each hinge mechanism 3 includes two coupling brackets 4 and a rotating module 5. The coupling brackets 4 are respectively mounted in the aligned mounting recesses 121a, and are respectively connected with left and right ends of the rotating module 5. Each coupling bracket 4 is of a one-single piece, and includes a mounting block 41 and an extension plate 42. The mounting block 41 is connected with the rotating module 5 and is fittingly disposed into the deep recess portion 1211. Specifically, the mounting block 41 has a block base 411, two side walls 412 respectively extending upwardly from two peripheral edges of the block base 411, and a slot forming wall 413 interconnecting the side walls 412. The block base 411 is formed with a plurality of leg insert slots 411a which are arranged in the inner-outer direction (D2) and elongated in an up-down direction (D3) that is transverse to both the inner-outer direction and the left-right direction. In this embodiment, the block base 411 has two arrays of first slot forming protrusions 411b spaced apart from one another in the inner-outer direction (D2) to define the leg insert slots 411a communicated with each other. Alternatively, the leg insert slots 411a may be still formed in the block base 411 but not communicated with each other. Each side wall 412 has two penetrating holes 412a. The slot forming wall 413 is formed with a plurality of plate insert slots 413a which are arranged in the inner-outer direction (D2) and extend in the left-right direction (D1). In this embodiment, the slot forming wall 413 has a plurality of second slot forming protrusions 413b spaced apart from one another in the inner-outer direction (D2) to define the plate insert slots 413a. The extension plate 42 extends from and is integrally formed with the mounting block 41 in the left-right direction (D1), and is fittingly disposed in the shallow recess portion 1212.

The extension plate 42 has a positioning hole 421 for insertion of the positioning post 14, and a fastening hole 422 for extension of a fastener (not shown), such as a screw, to fasten the extension plate 42 to the device housing 1.

Figure 7:
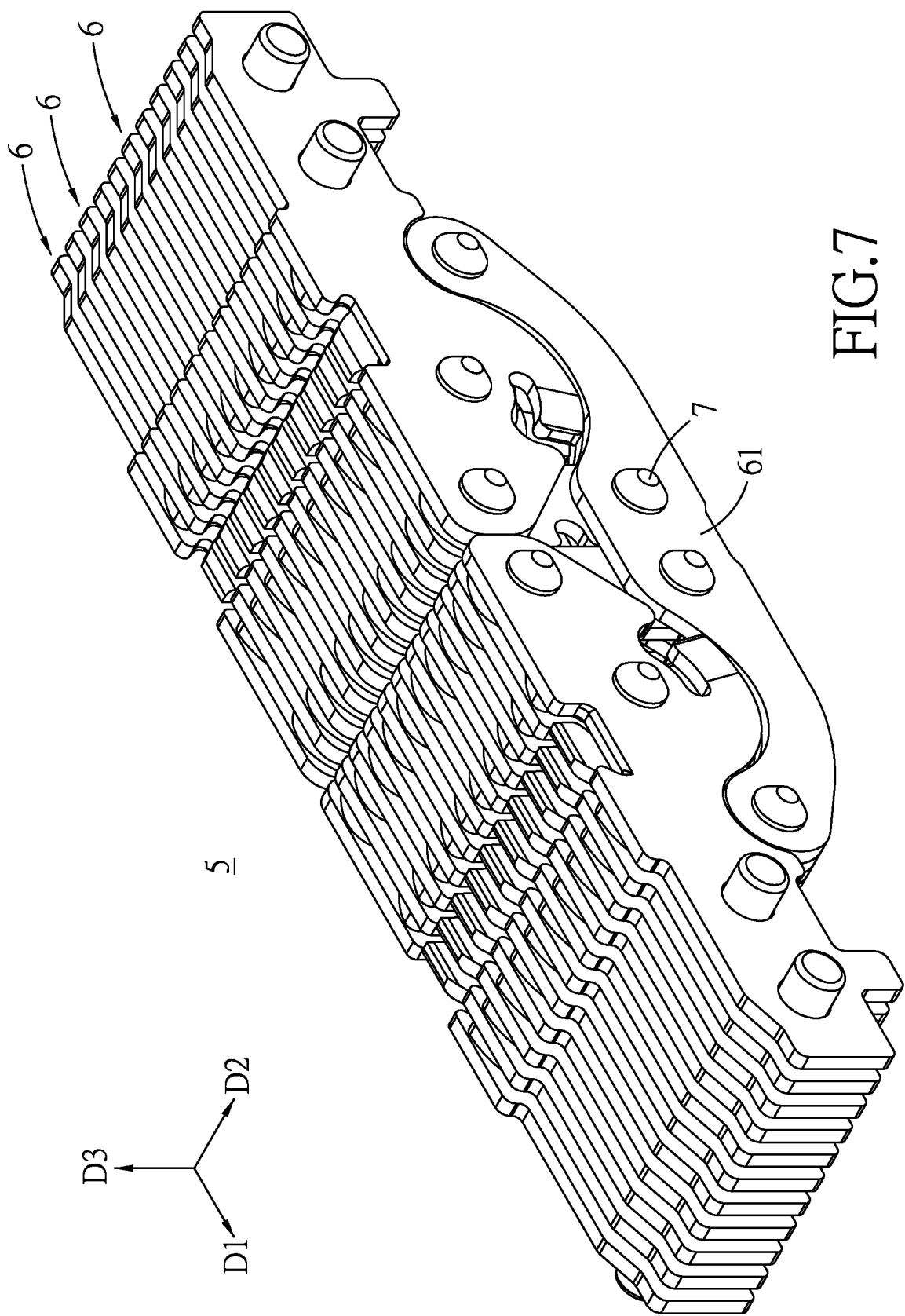
FIG. 7 is a perspective view of a rotating module of the hinge mechanism.
Figure 8:
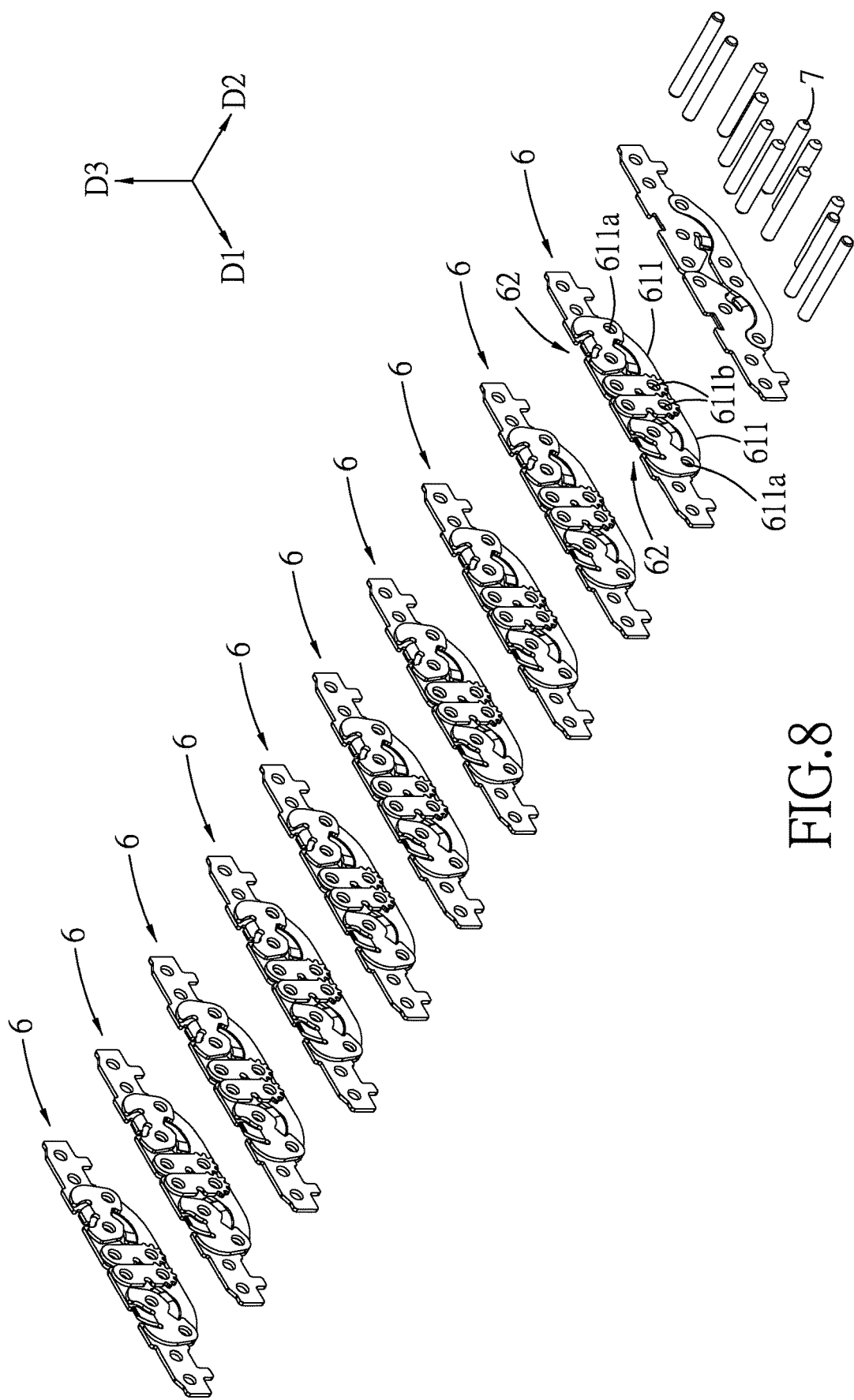
FIG. 8 is an exploded perspective view of the rotating module.
Figure 9:
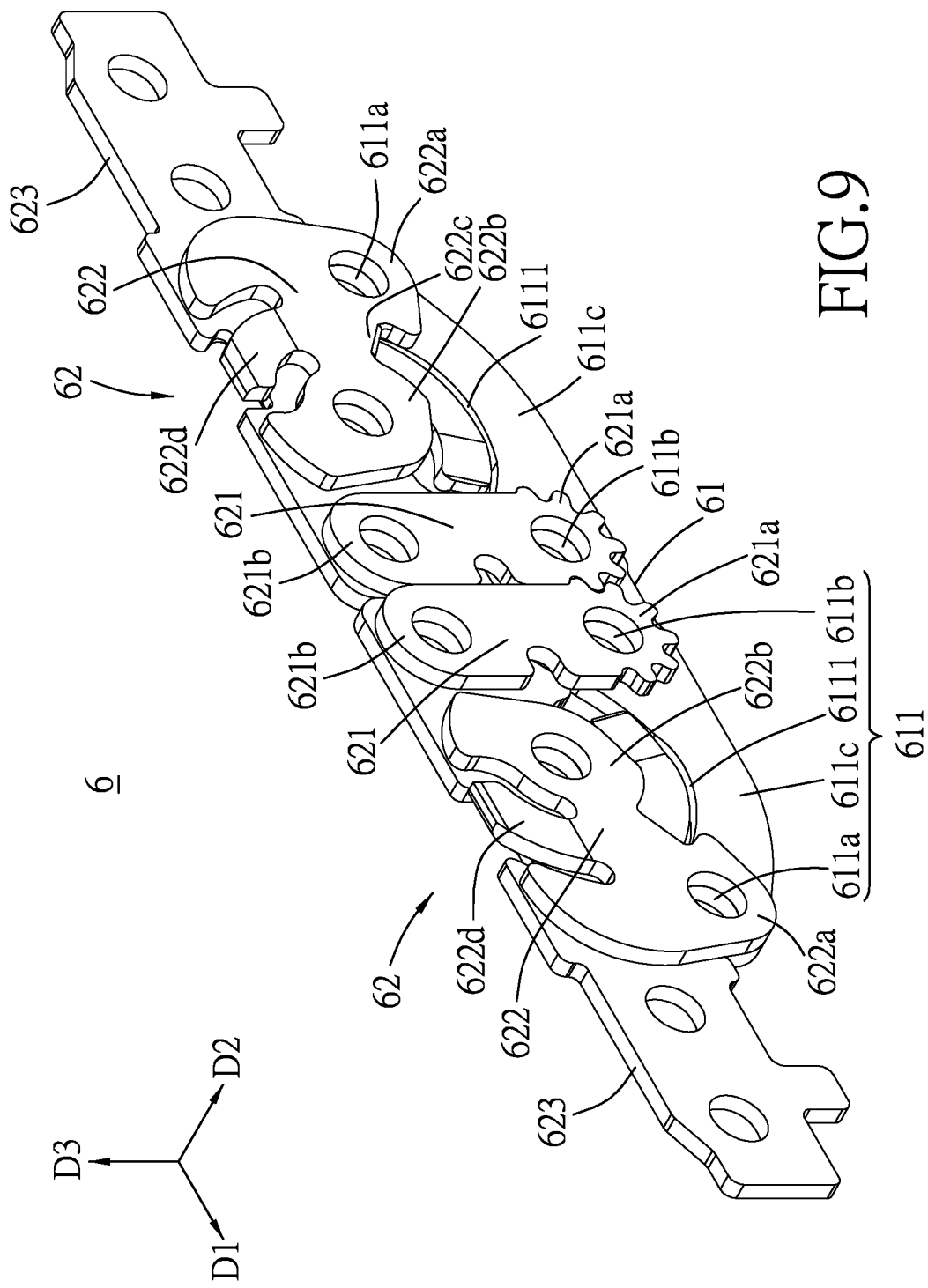
FIG. 9 is a perspective view of a linkage unit of the rotating module.
Figure 10:
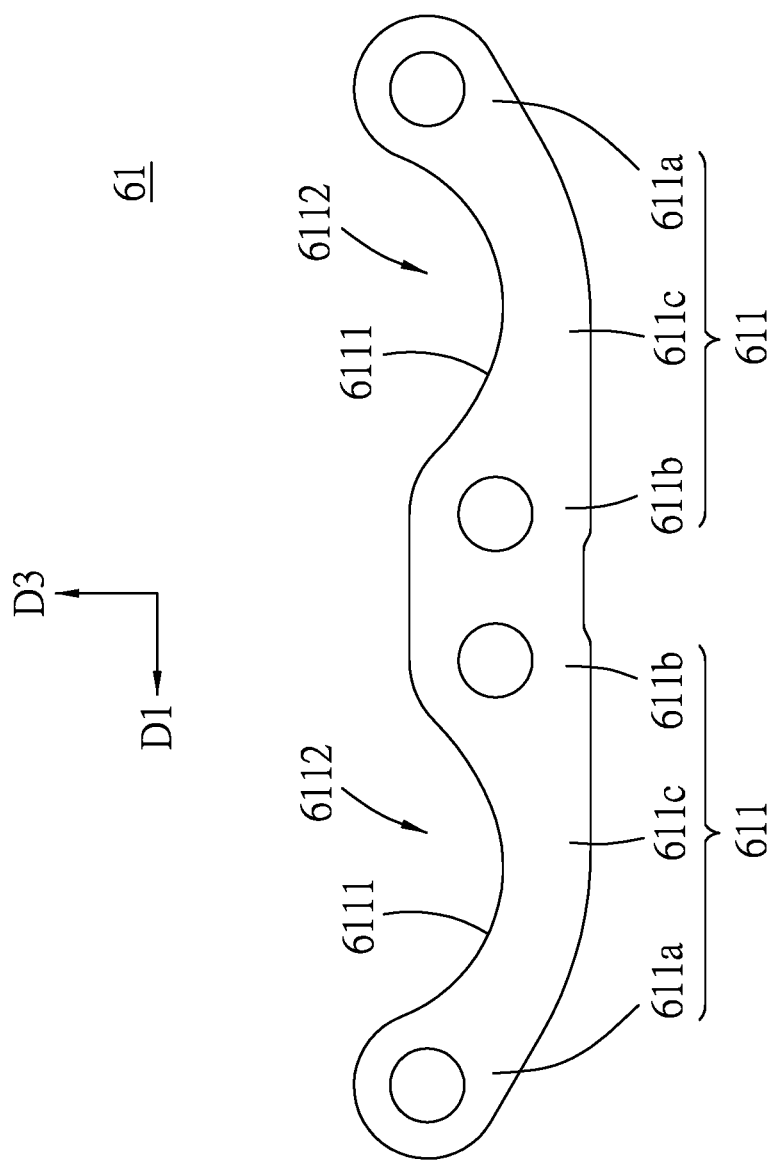
FIG. 10 is a front view of a base bar of the linkage unit.

Referring to FIGS. 7 and 8, the rotating module 5 includes a plurality of linkage units 6 and a plurality of insert pins 7. The linkage units 6 are aligned with and juxtaposed to each other in the inner-outer direction (D2), and are retained to each other by means of the insert pins 7. Referring to FIGS. 9 and 10, each of the linkage units 6 includes a base bar 61 and two rotating assemblies 62. The base bar 61 has two carrying sections 611 which are integrally formed with and opposite to each other in the left-right direction (D1). Each carrying section 611 has a central pivot portion 611b and an end pivot portion 611a opposite to each other in the left-right direction (D1), and an arcuate support portion 611c which is interposed between the central and end pivot portions 611b, 611a. The central pivot portions 611b of the base bar 61 are integrally connected with each other. The arcuate support portion 611c has an arcuate upper edge 6111 that faces upwardly and defines a concaved space 6112.

Referring to FIGS. 8 to 10, the rotating assemblies 62 are respectively and pivotally connected with the carrying sections 611 and symmetrical with each other in the left-right direction (D1). Specifically, each rotating assembly 62 has a synchronous rotation bar 621, a friction plate 622 and a torsion plate 623. The synchronous rotation bar 621 has a first pivot end 621a which is pivotally connected with the central pivot portion 611b of the respective carrying section 611 by virtue of one insert pin 7, and a second pivot end 621b opposite to the first pivot end 621a. The first pivot ends 621a of the synchronous rotation bars 621 mesh with each other so as to allow synchronous rotations of the second pivot ends 621b in opposite directions.

Figure 11:
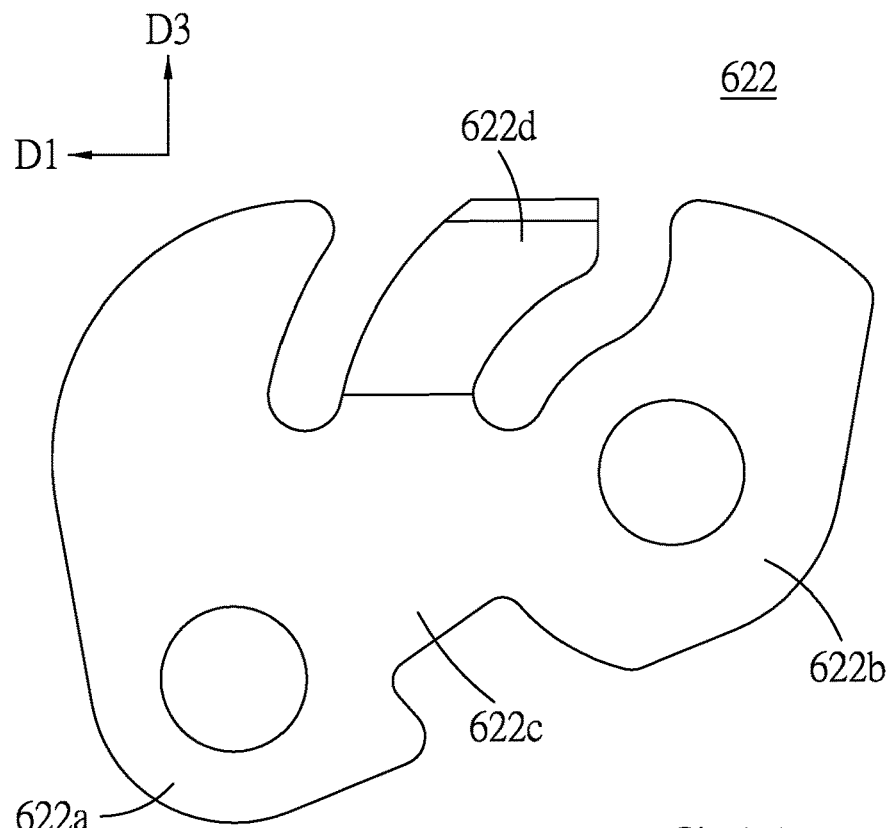
FIG. 11 is a front view of a friction plate of a rotating assembly of the linkage unit.
Figure 12:
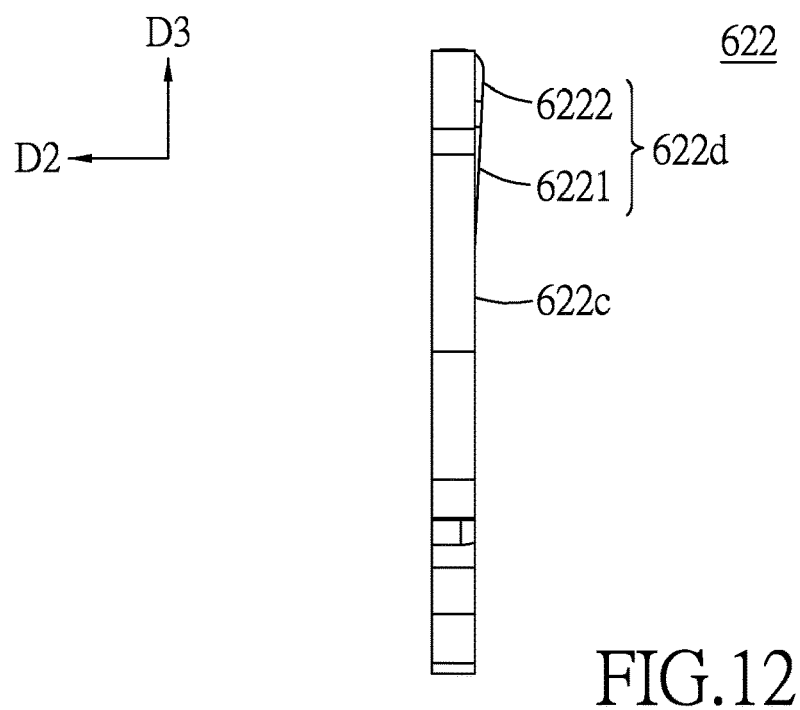
FIG. 12 is a side view of the friction plate.

Referring to FIGS. 9, 11 and 12, the friction plate 622 has proximate and distal end portions 622b, 622a relative to the synchronous rotation bar 621, a first major plate body 622c interposed between the proximate and distal end portions 622b, 622a, and a friction increasing portion 622d extending from and inclined outwardly away from the first major plate body 622c in the inner-outer direction (D2) (i.e., toward the torsion plate 623) to not be coplanar with the first major plate body 622c. The distal end portion 622a is pivotally connected with the end pivot portion 611a of the respective carrying section 611. The friction increasing portion 622d has a first inclined segment 6221 and a second inclined segment 6222 proximate to and distal from the first major plate body 622c, respectively. The slope of the first and second inclined segments 6221, 6222 may be the same. The friction plate 622 is operatively rotatable about a center of the distal end portion 622a.

Figure 13:
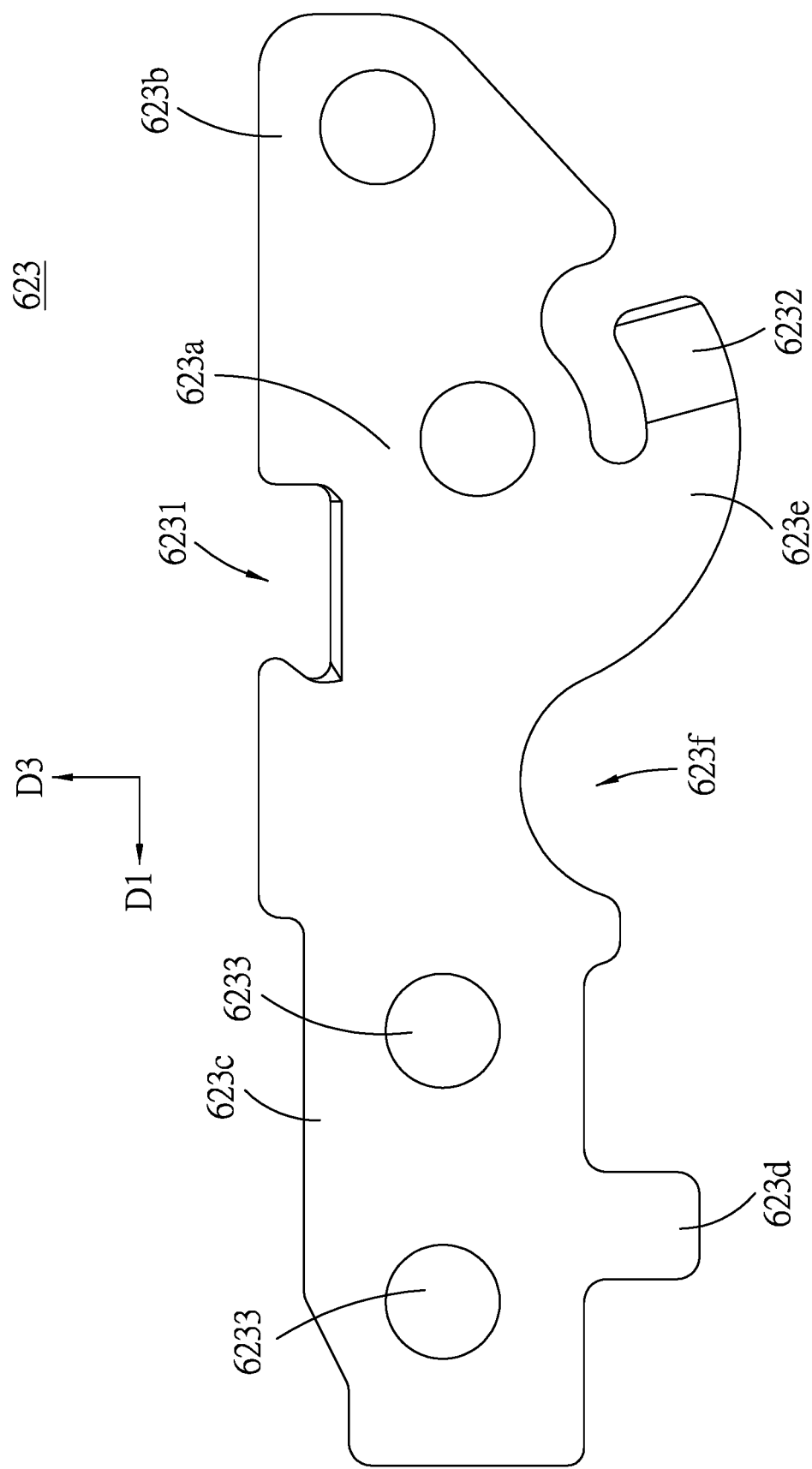
FIG. 13 is a front view of a torsion plate of the rotating assembly.

With reference to FIGS. 9 and 13, the torsion plate 623 is disposed outwardly of the friction plate 622 and the synchronous rotation bar 621 in the inner-outer direction (D2), and has a second major plate body 623a which extends in the left-right direction (D1) to terminate at a link end 623b and a driven end 623c proximate to and distal from the synchronous rotation bar 621, respectively, a protrusion 623e which extends downwardly from the second major plate body 623a, and a positioning notch 623f which is formed at a lower edge of the second major plate body 623a and concaved upwardly. The second major plate body 623a is pivotally connected with the proximate end portion 622b of the friction plate 622, and has an upper notch 6231 formed at an upper edge thereof. The link end 623b is pivotally connected with the second pivot end 621b of the synchronous rotation bar 621. The driven end 623c is in the form of a plate which has two through holes 6233 respectively aligned with the penetrating holes 412a of the corresponding coupling bracket 4 (see FIG. 6). Further referring to FIGS. 9 and 13 in combination with FIG. 6, the plate of the driven end 623c is inserted into and soldered in the respective plate insert slot 413a and has the insert pins 7 extending through the aligned penetrating and through holes 412a, 6233. The driven end 623c has a leg 623d which extends downwardly from the plate and is inserted into and soldered in the respective leg insert slot 411a.

Figure 14:
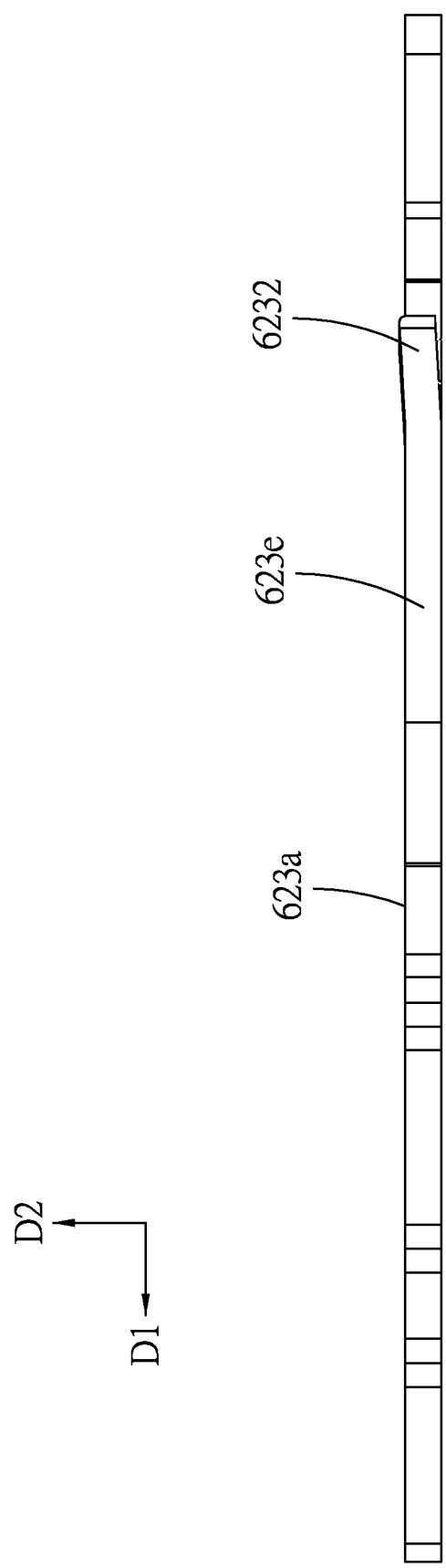
FIG. 14 is a bottom view of the torsion plate.

Referring to FIGS. 13 and 14, the protrusion 623e extends downwardly from the lower edge of the second major plate body 623a and further toward the link end 623b. In this embodiment, a rim segment of the protrusion 623e is fittable with a rim segment of the friction increasing portion 622d (see FIG. 11), and is inclined inwardly toward the friction plate 622 in the inner-outer direction (D2) to terminate at a trailing portion 6232 that is not coplanar with the second major plate body 623a. Thus, the torsion plate 623 is operatively turnable upwardly to have the protrusion 623e moved on and along the arcuate upper edge 6111 of the carrying section 611. The torsion plates 623 of the rotating assemblies 62 are synchronously turnable relative to the base bar 61, through a torque generated as a result of the synchronous rotations of the second pivot ends 621b of the synchronous rotation bars 621, and rotate the synchronous rotation bars 621 and the friction plates 622 in a direction opposite to the torsion plates 623.

Figure 15:
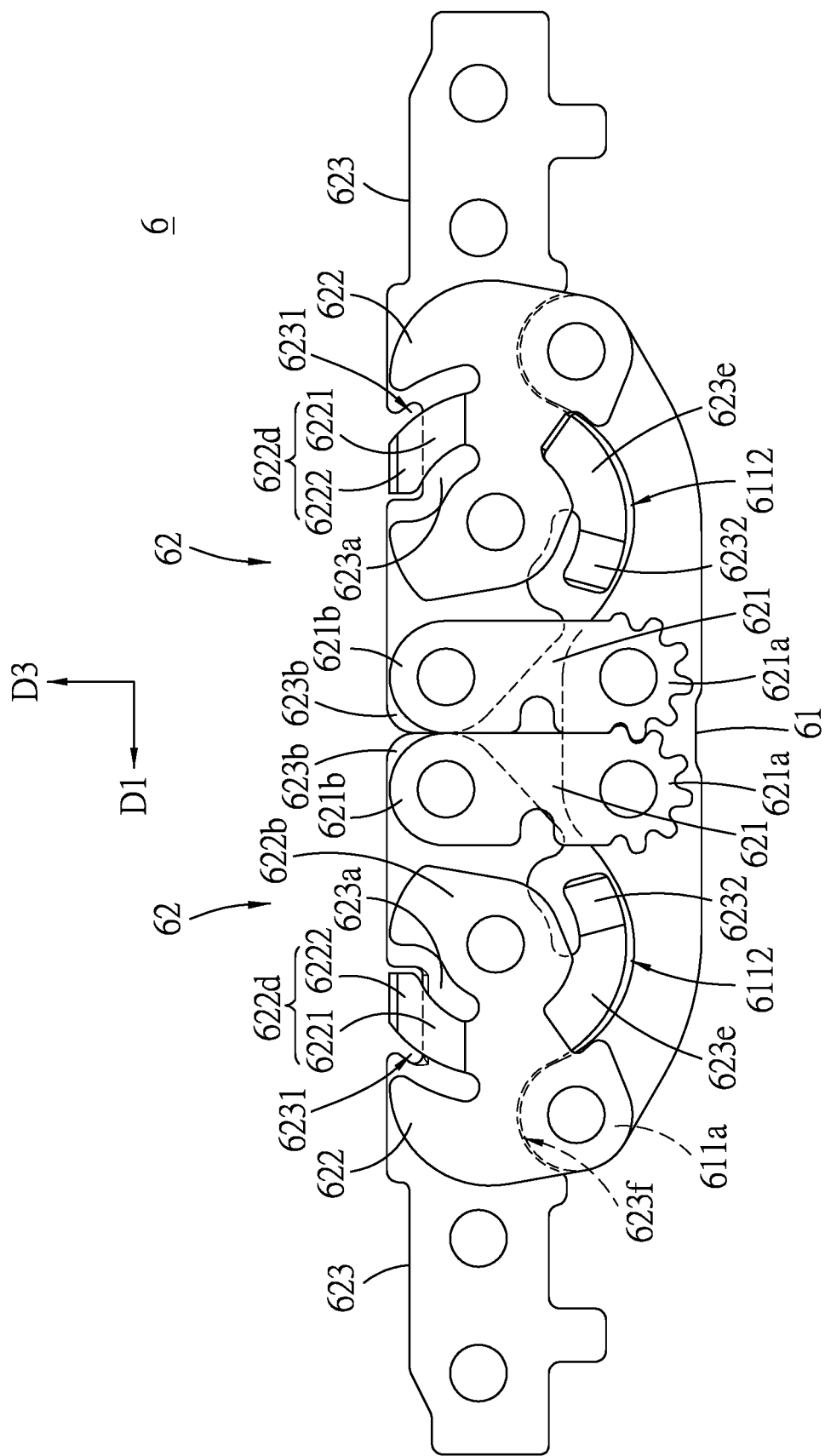
FIG. 15 is a schematic view illustrating two rotating assemblies of the linkage unit in an unfolded position.
Figure 18:
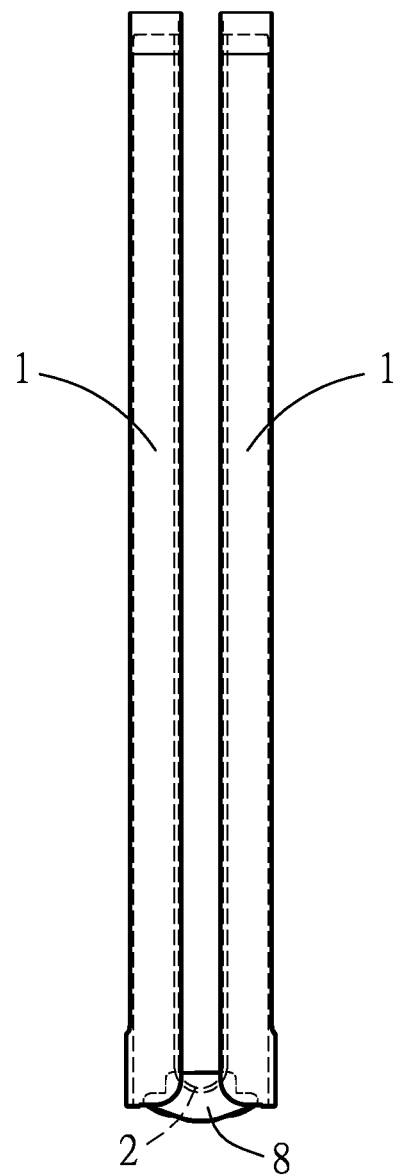
FIGS. 18 and 19 illustrate the display device and the rotating assemblies in the folded position.

Referring to FIGS. 1, 15, 18 and 20, the display device 100 is pivotable between a flat lying state (see FIG. 1) and a folded state (see FIG. 18). When the display device 100 is in the flat lying state, the rotating assemblies 62 of each hinge mechanism 3 are in an unfolded position, as shown in FIG. 15. When the display device 100 is in the folded state, the rotating assemblies 62 are in a folded position, as shown in FIG. 19.

With reference to FIG. 15, when the rotating assemblies 62 is in the unfolded position, the end pivot portions 611a of the base bar 61 are fittingly received in the positioning notches 623f of the torsion plates 623 and the length of the torsion plates 623 is in the left-right direction (D1), which extends horizontally in this embodiment. At this stage, the link ends 623b are close to each other to have the torsion plates 623 horizontally aligned and flush with each other, and the rims of the protrusions 623e fittingly received in the concaved spaces 6112 of the carrying sections 611. The synchronous rotation bars 621 are erected and juxtaposed to each other. The first inclined segments 6221 of the friction increasing portions 622d of the friction plates 622 are in frictional contact with the second major plate bodies 623a of the torsion plates 623 with a friction force, and the second inclined segments 6222 are aligned with the upper notches 6231 to be spaced apart from the torsion plates 623 in the inner-outer direction (D2).

Figure 16:
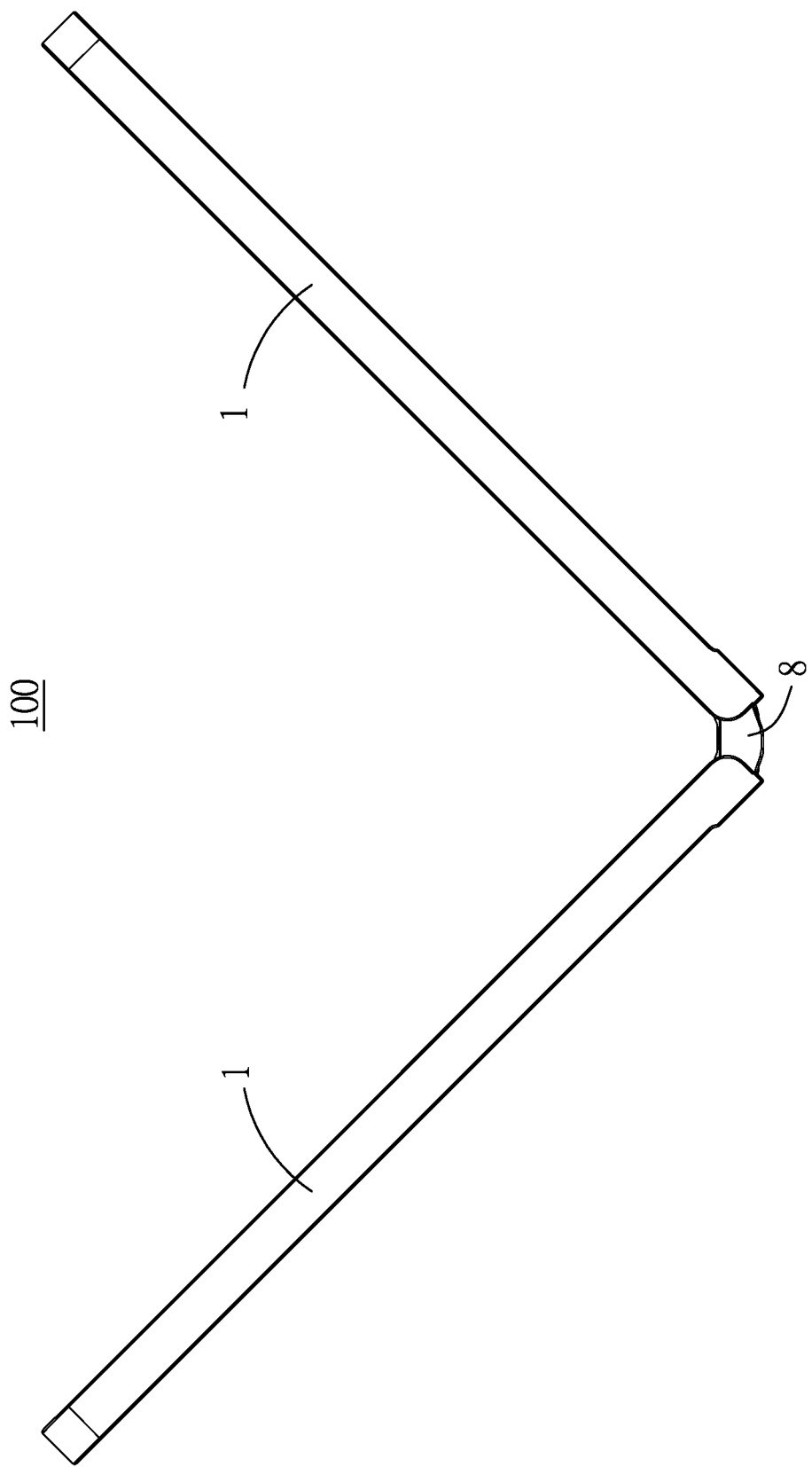
FIGS. 16 and 17 illustrate how the display device is turned from the flat lying state to a folded state.
Figure 17:
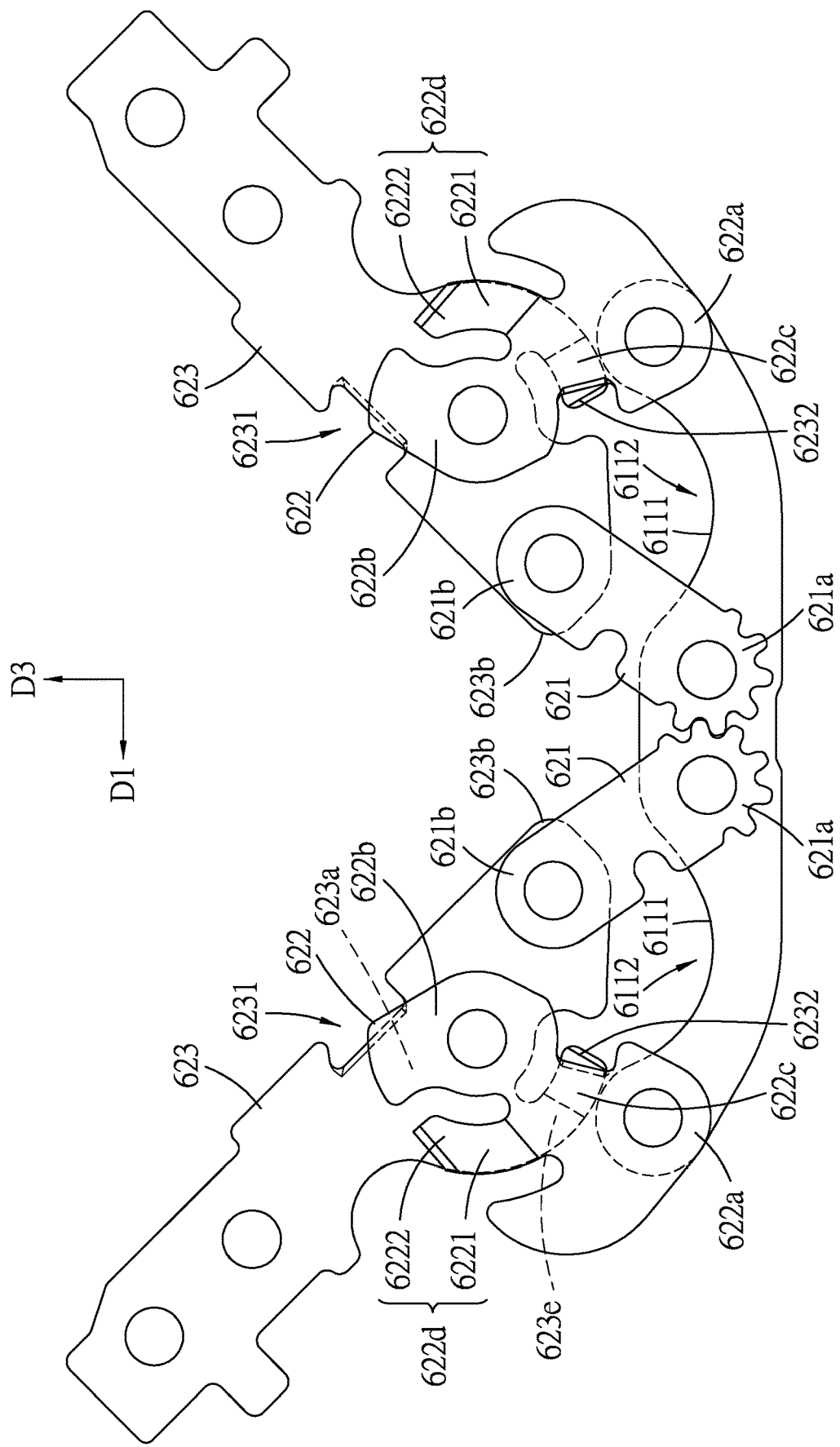

With reference to FIGS. 16 and 17, when the display device 100 is moved from the flat lying state to the folded state to turn the device housings 1 toward each other, the torsion plates 623 are synchronously turned from the unfolded position to the folded position. Specifically, the torsion plates 623 are moved along the arcuate upper edges 6111 of the base bar 61, and the synchronous rotation bars 621 and the friction plates 622 are moved in a direction opposite to the torsion plates 623. The second pivot ends 621b of the rotation bars 621 are turned in opposite directions to be remote from each other toward the concaved spaces 6112 while the the proximate end portions 622b of the friction plates 622 are turned upwardly, which produces a torque to move the protrusions 623e of the torsion plates 623 out from the concaved spaces 6112 and to bring the second inclined segments 6222 of the friction increasing portions 622d into gradually overlapping upon the second major plate body 623a to increase the friction force. With the friction increasing portions 622d of the friction plates 622, the friction force is gradually increased during the turning of the torsion plates 623 so as to provide a stable and firm feeling to the user. Moreover, the trailing portions 6232 of the protrusions 623e are gradually overlapped upon the first major plate bodies 622c of the friction plates 622 to further increase the friction between the friction plates 622 and the torsion plates 623.

Figure 19:
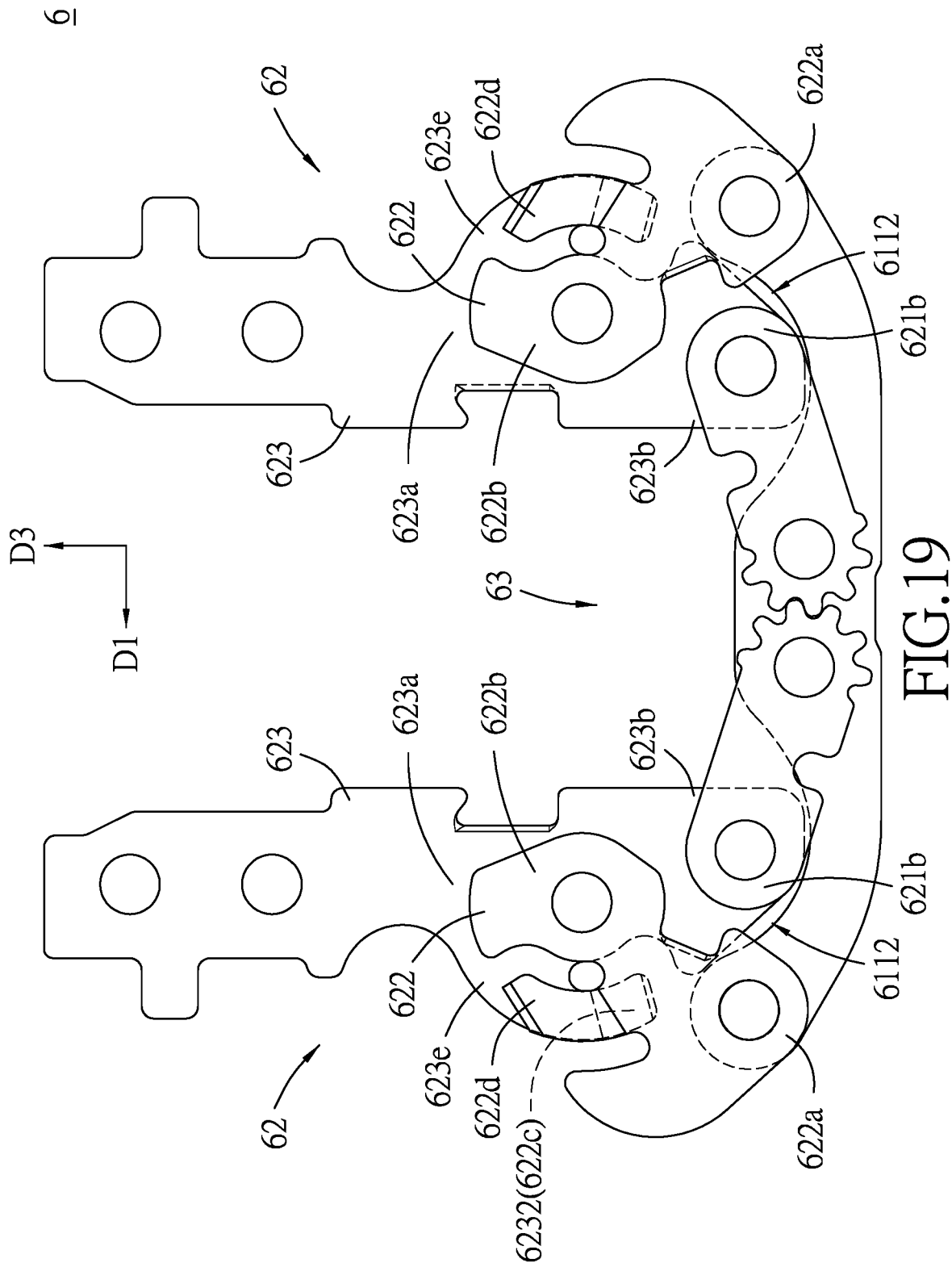
Figure 20:
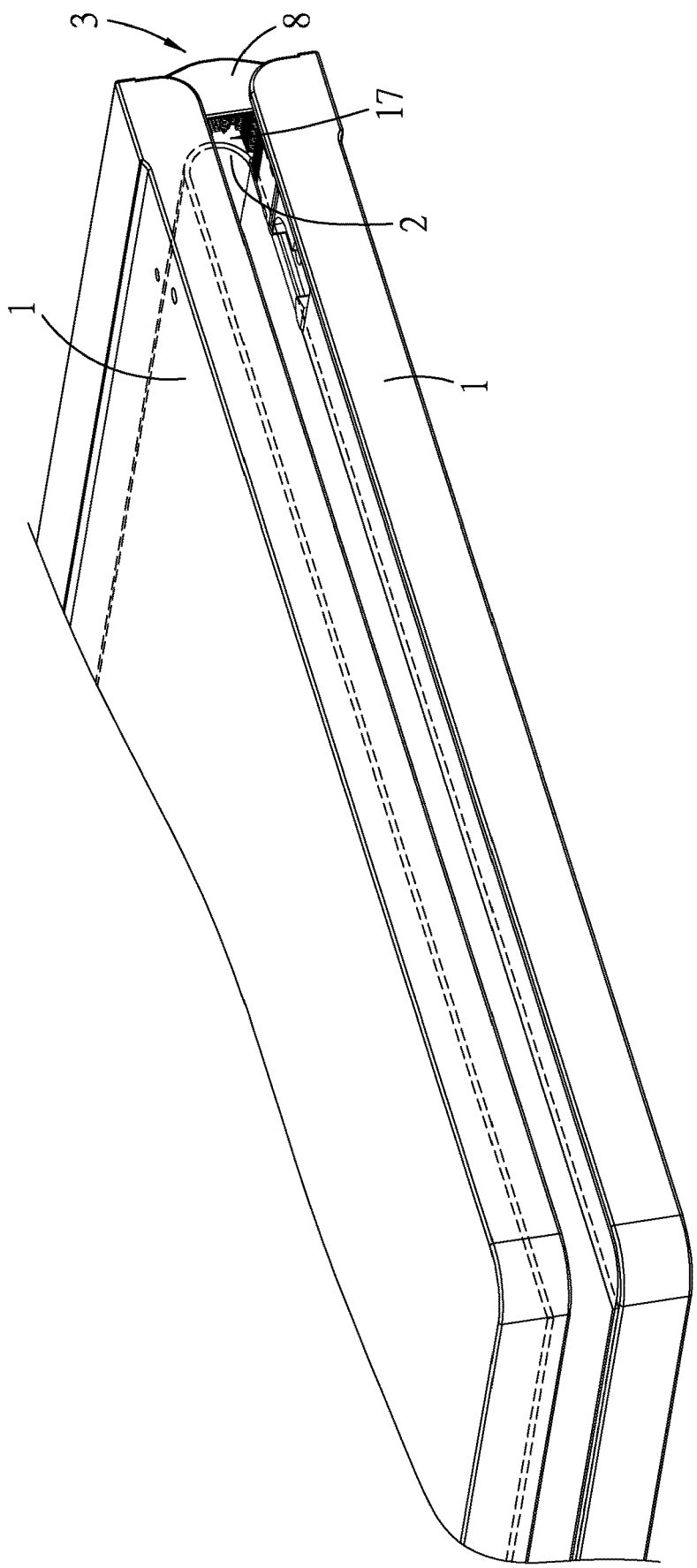
FIG. 20 is a fragmentary perspective view of FIG. 18, illustrating a bending portion of a flexible display sheet received in a receiving space.

With reference to FIGS. 18 to 20, when the display device 100 is in the folded state to have the flexible display sheet 2 bent, the rotating assemblies 62 of each hinge mechanism 3 are in the folded position. The torsion plates 623 extend in the up-down direction (D3), i.e., extend uprightly. The link ends 623b of the torsion plates 623 are moved into the concaved spaces 6112 and away from each other such that the torsion plates 623 are moved to be remote from each other in the left-right direction (D1) to cooperate with the base bar 61 to forma bending space 63 thereamong. Thus, the device housings 1 are remote from each other to form a receiving space 17 therebetween and the flexible display sheet 2 is bent to have a bending portion received in the receiving space 17 (see FIG. 20). As shown in FIG. 19, the friction increasing portions 622d of the friction plates 622 are entirely overlapped upon and in frictional contact with the second major plate bodies 623a of the torsion plates 623 while the protrusions 623e are entirely overlapped upon and in frictional contact with the first major plate bodies 622c and the friction increasing portions 622d of the friction plates 622. Hence, the display device 100 is kept firmly in the folded state.

Figure 4:
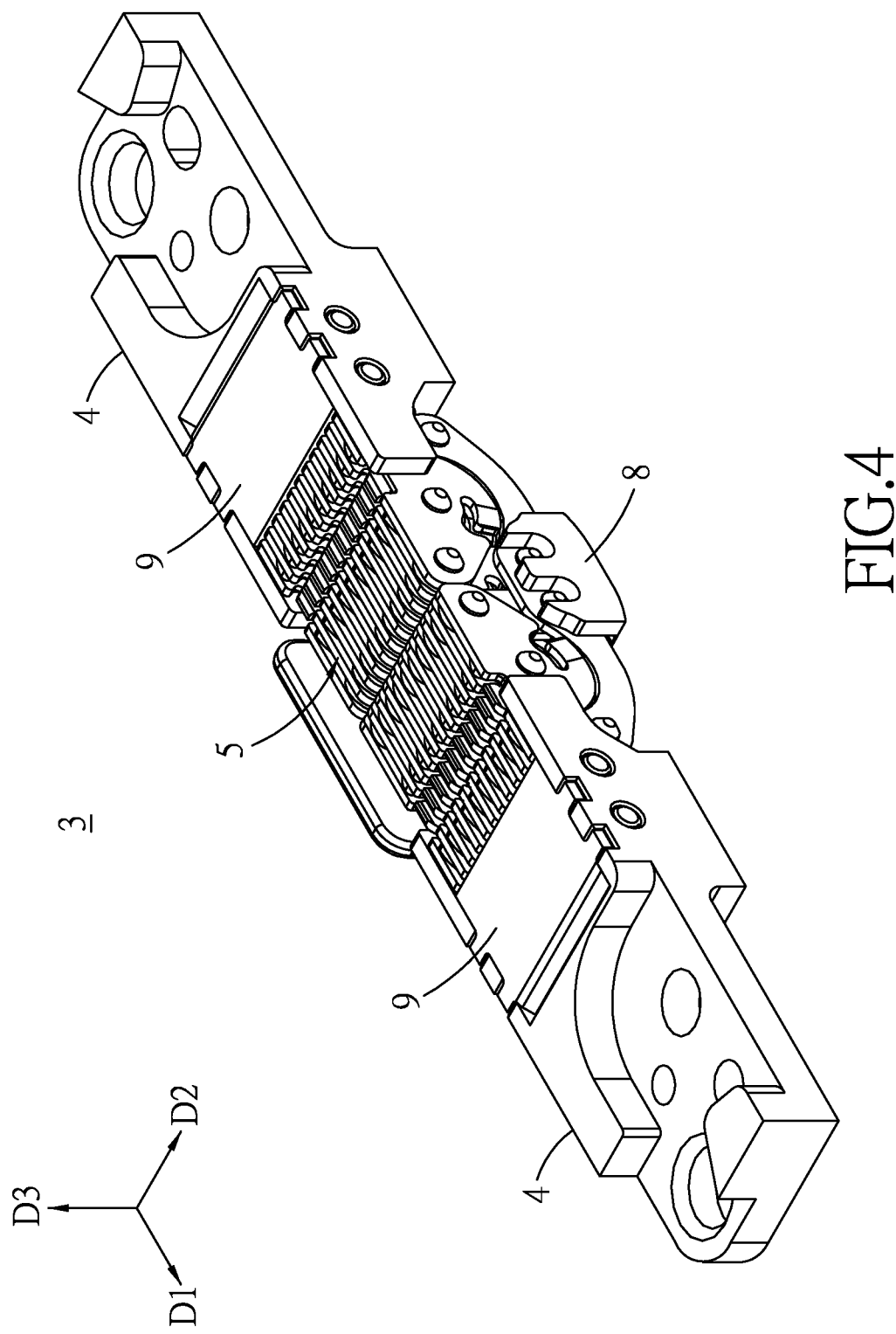
FIG. 4 is a perspective view of a hinge mechanism of the embodiment.
Figure 5:
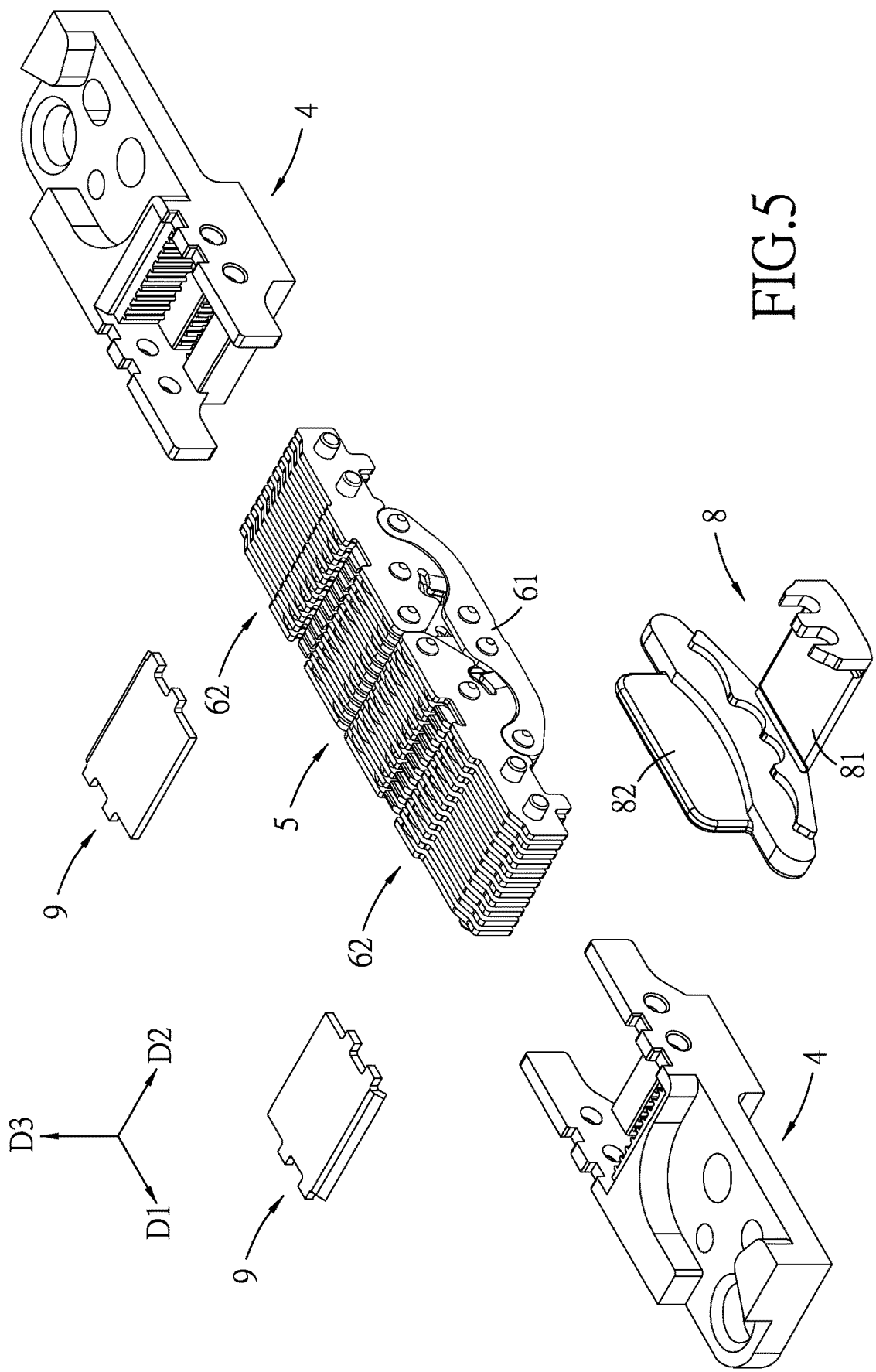
FIG. 5 is an exploded perspective view of the hinge mechanism.
Figure 6:
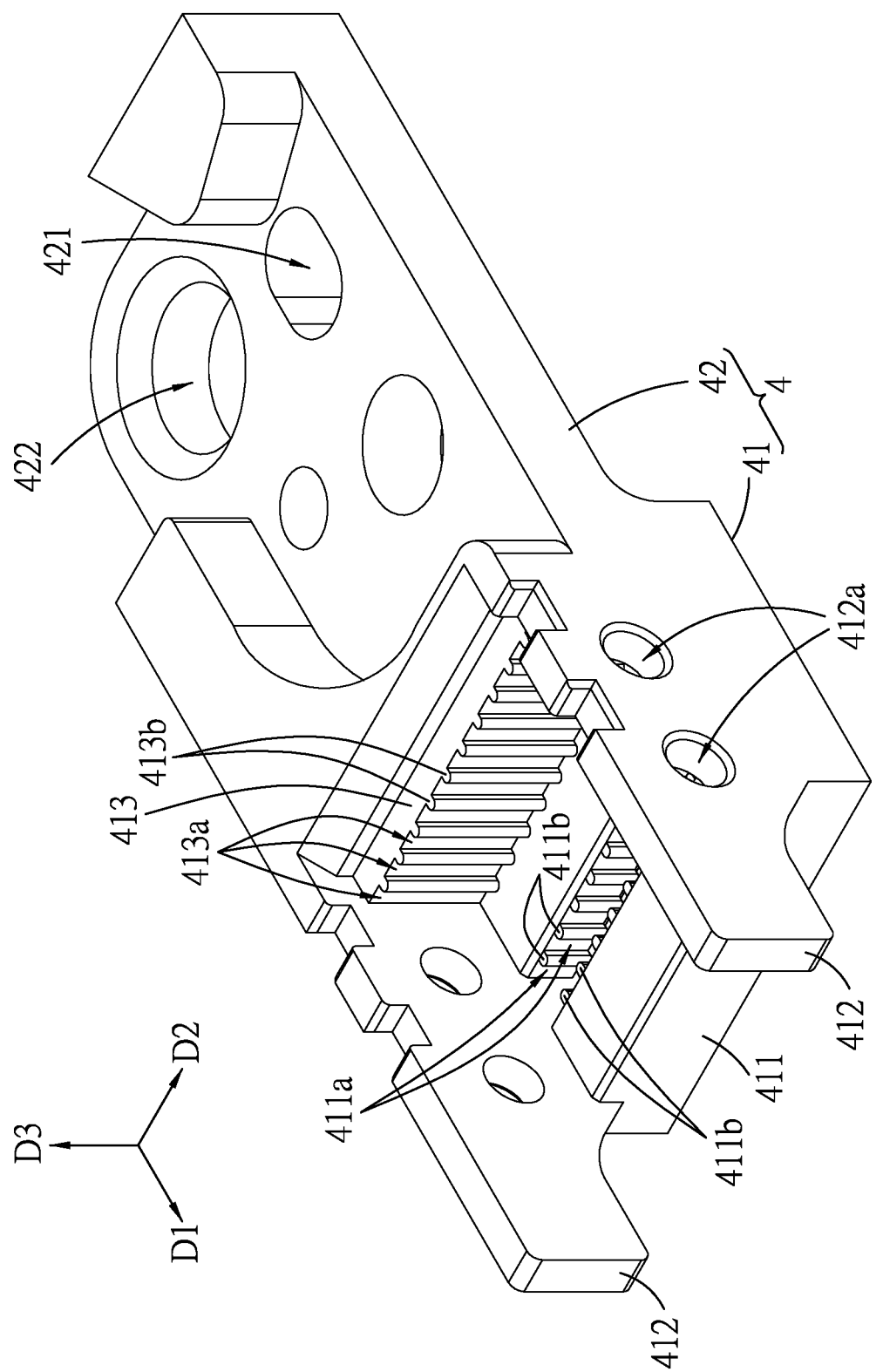
FIG. 6 is a perspective view of a coupling bracket of the hinge mechanism.

Referring to FIGS. 4 and 5, each hinge mechanism 3 further includes a dust-proof cover 8 and two cover plates 9. The dust-proof cover 8 includes a lower cover portion 81 disposed to cover lower sides of the base bars 61 of the linkage units 6, and an outboard cover portion 82 extending upwardly from an outer edge of the lower cover portion 81 to cover the rotating assemblies 62 of an outmost one of the linkage units 6 in the inner-outer direction (D2). The hinge mechanisms 3 can be concealed and protected from dust during the turning of the display device 100. Each cover plate 9 is disposed on the side walls 412 of the mounting block 41 of the coupling bracket 4, and abuts against the torsion plates 623 at the driven ends 623c so as to further retain the torsion plates 623 to the coupling brackets 4 and to protect the hinge mechanism 3 from dust.

As illustrated, with two symmetric rotating assemblies 62 of each linkage unit 6 having the synchronous rotation bars 621 meshing with each other, the torsion plates 623 are synchronously turnable so as to avoid damage to the flexible display sheet 2 during turning of the display device 100. In the folded position, a bending space 63 is formed among the torsion plates 623 and the base bar 61 to produce a receiving space 17 between the device housings 1 for receiving the bending portion of the flexible display sheet 2. Moreover, in the folded position, the first inclined segment 6221 of the friction increasing portion 622d of each friction plate 622 is in frictional contact with the second major plate body 623a of the corresponding torsion plate 623 with a friction force. Also during the turning of the torsion plate 623 from the unfolded position to the folded position, the second inclined segment 6222 is gradually overlapped upon and in frictional contact with the second major plate body 623a to gradually increase the friction force so as to turn the display device 100 stably and smoothly.

While the disclosure has been described in connection with what is considered the exemplary embodiment, it is understood that this disclosure is not limited to the disclosed embodiment but is intended to cover various arrangements included within the spirit and scope of the broadest interpretation so as to encompass all such modifications and equivalent arrangements.

What is claimed is:

1. A hinge mechanism comprising:
  a plurality of linkage units aligned with and juxtaposed to each other in an inner-outer direction, each of said linkage units including
    a base bar having two carrying sections which are integrally formed with and opposite to each other in a left-right direction transverse to the inner-outer direction, each of said carrying sections having a central pivot portion and an end pivot portion, said central pivot portions of said carrying sections being integrally connected with each other; and
    two rotating assemblies respectively and pivotally connected with said carrying sections, each of said rotating assemblies having
      a synchronous rotation bar having a first pivot end which is pivotally connected with said central pivot portion of said respective carrying section, and a second pivot end opposite to said first pivot end, said first pivot ends of said synchronous rotation bars meshing with each other so as to allow synchronous rotations of said second pivot ends in opposite directions,
      a friction plate having proximate and distal end portions relative to said synchronous rotation bar, a first major plate body interposed between said proximate and distal end portions, and a friction increasing portion extending from and inclined outwardly away from said first major plate body in the inner-outer direction to not be coplanar with said first major plate body, said distal end portion being pivotally connected with said end pivot portion of said respective carrying section, said friction increasing portion having a first inclined segment and a second inclined segment proximate to and distal from said first major plate body, respectively, and
      a torsion plate disposed outwardly of said friction plate and said synchronous rotation bar in the inner-outer direction, and having a second major plate body which is pivotally connected with said proximate end portion of said friction plate and which extends in the left-right direction to terminate at a link end and a driven end proximate to and distal from said synchronous rotation bar, respectively, said link end being pivotally connected with said second pivot end of said synchronous rotation bar,
  wherein said torsion plates of said rotating assemblies are synchronously turnable relative to said base bar, through a torque generated as a result of the synchronous rotations of said second pivot ends, between an unfolded position, where said torsion plates extend in the left-right direction, said first inclined segment of said friction increasing portion of said friction plate is in frictional contact with said second major plate body with a friction force, and said second inclined segment is spaced apart from said respective torsion plate in the inner-outer direction, and a folded position, where said torsion plates extend in an up-down direction transverse to both the inner-outer direction and the left-right direction and are remote from each other in the left-right direction to form a bending space therebetween, and wherein during turning of said torsion plates from the unfolded position to the folded position, said second inclined segment is gradually overlapped upon said second major plate body to increase the friction force.

2. The hinge mechanism as claimed in claim 1, wherein said torsion plate of each of said rotating assemblies has a protrusion which extends from said second major plate body and is inclined inwardly toward said friction plate in the inner-outer direction to terminate at a trailing portion that is not coplanar with said second major plate body such that, in the folded position, said protrusion is in frictional contact with said first major plate body of said friction plate.

3. The hinge mechanism as claimed in claim 2, wherein each of said carrying sections of said base bar has an arcuate support portion which is interposed between said central and end pivot portions and which has an arcuate upper edge that faces upwardly, said protrusion of said torsion plate being configured to be movable on and along said arcuate upper edge during the turning of said torsion plate.

4. The hinge mechanism as claimed in claim 1, said hinge mechanism being disposed between two device housings, said hinge mechanism further comprising two coupling brackets, said coupling brackets being respectively mountable on said device housings and being respectively connected with said torsion plates of each of said rotating assemblies, each of said coupling brackets being formed with a plurality of plate insert slots which are arranged in the inner-outer direction and extend in the left-right direction, and a plurality of leg insert slots which are arranged in the inner-outer direction and elongated in the up-down direction and lower than said plate insert slots, said driven end of said torsion plate of each of said rotating assemblies being in form of a plate which is insertable into a respective one of said plate insert slots, and having a leg which extends downwardly from said plate and is insertable into a respective one of said leg insert slots.

5. The hinge mechanism as claimed in claim 1, further comprising a dust-proof cover which includes a lower cover portion disposed to cover lower sides of said base bars of said linkage units, and an outboard cover portion extending upwardly from an outer edge of said lower cover portion to cover said rotating assemblies of an outmost one of said linkage units in the inner-outer direction.

6. A display device comprising:
two device housings;
two hinge mechanisms as claimed in claim 1, each of said hinge mechanisms further comprising two coupling brackets, said coupling brackets being respectively mounted on said device housings and being respectively connected with said torsion plates of said rotating assemblies; and
a flexible display sheet attached to said device housings, wherein, when said torsion plates of said rotating assemblies of each hinge mechanism is in the folded position, said device housings are remote from each other to form a receiving space therebetween and said flexible display sheet is bent to have a bending portion received in said receiving space.

7. The display device as claimed in claim 6, wherein each of said device housings includes a base major wall, two first side walls extending upwardly and respectively from two peripheral edges of said base major wall and opposite to each other in the inner-outer direction to cooperate with said base major wall to define a sheet mounting space thereamong for accommodating said flexible display sheet, said first side walls of said device housings at the same peripheral edge respectively having mounting recesses which are aligned with each other in the left-right direction for cooperatively receiving a respective one of said hinge mechanisms.

8. The display device as claimed in claim 7, wherein each of said mounting recesses includes a deep recess portion and a shallow recess portion aligned with each other in the left-right direction, and a positioning post formed in said shallow recess portion, each of said coupling brackets including a mounting block which is fittingly disposed in said deep recess portion, and an extension plate which extends from and is integrally formed with said mounting block in the left-right direction and which is fittingly disposed in said shallow recess portion and positioned by said positioning post, said mounting block being formed with a plurality of plate insert slots which are arranged in the inner-outer direction and extend in the left-right direction, and a plurality of leg insert slots which are arranged in the inner-outer direction and elongated in the up-down direction and lower than said plate insert slots, said driven end of said torsion plate of each of said rotating assemblies being in form of a plate which is insertable into a respective one of said plate insert slots, and having a leg which extends downwardly from said plate and is insertable into a respective one of said leg insert slots.

9. The display device as claimed in claim 7, wherein each of said first side walls has a sheet aligning wall surface extending in the left-right direction, and a sheet attaching wall surface formed inwardly of and lower than said sheet aligning wall surface, each of said device housings having a plurality of bracing posts which extend from said base major wall, said flexible display sheet having a bottom major surface attached to said sheet attaching wall surfaces of said first side walls and said bracing posts, and a top major surface aligned with said sheet aligning wall surfaces of said first side walls.

\* \* \* \* \*